United States Patent [19]

Weavers

[11] 4,087,145

[45] May 2, 1978

[54] MAGNETIC TAPE CARTRIDGE CASE WITH BIASING MEANS

[75] Inventor: Mark W. Weavers, Saint Paul, Minn.

[73] Assignee: Minnesota Mining and Manufacturing company, Saint Paul, Minn.

[21] Appl. No.: 710,009

[22] Filed: Jul. 30, 1976

[51] Int. Cl.² ............................................ A47B 88/00
[52] U.S. Cl. .................................... 312/319; 206/387
[58] Field of Search .................. 312/8, 9, 10, 12, 319; 206/387

[56] References Cited

U.S. PATENT DOCUMENTS

| | | | |
|---|---|---|---|
| 3,899,229 | 8/1975 | Ackeret | 312/319 |
| 3,994,551 | 11/1976 | Ackeret | 312/319 |
| 3,995,921 | 12/1976 | Ackeret | 312/12 |

Primary Examiner—Paul R. Gilliam
Assistant Examiner—David H. Corbin
Attorney, Agent, or Firm—Cruzan Alexander; Donald M. Sell; William L. Huebsch

[57] ABSTRACT

A case for storing a magnetic tape cartridge has a housing, a bias means that opposes movement of a cartridge or a drawer adapted to receive a cartridge into the housing and a latch means for engaging the cartridge or drawer to releasably retain it in the housing. The bias means is positioned near one end of the housing to serve the dual function of pivoting the cartridge or drawer into a latched condition when fully inserted in the housing and also moving the member or drawer toward an open position when unlatched.

3 Claims, 8 Drawing Figures

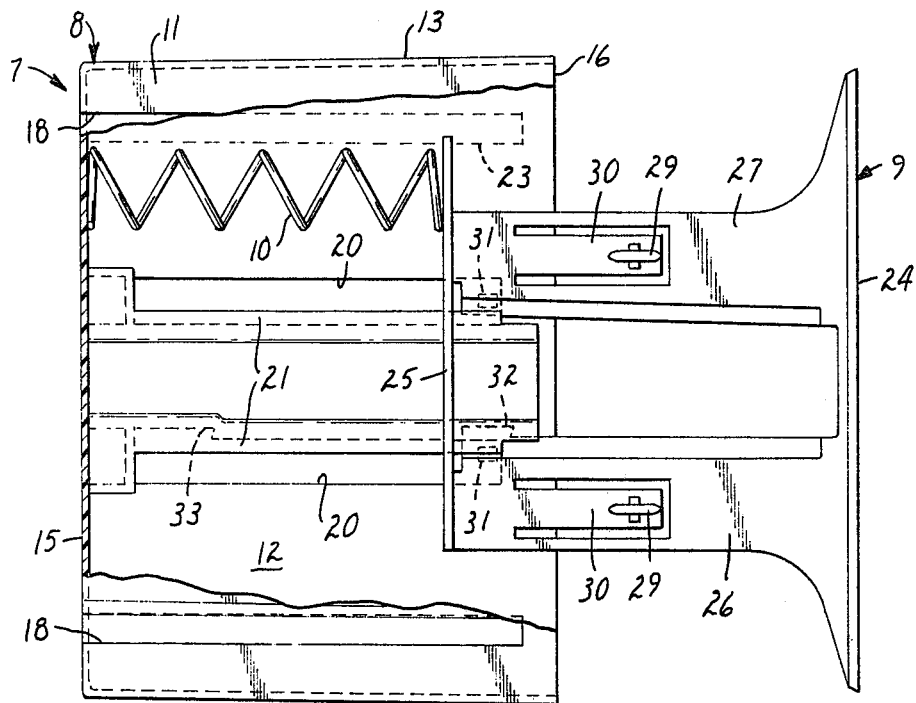
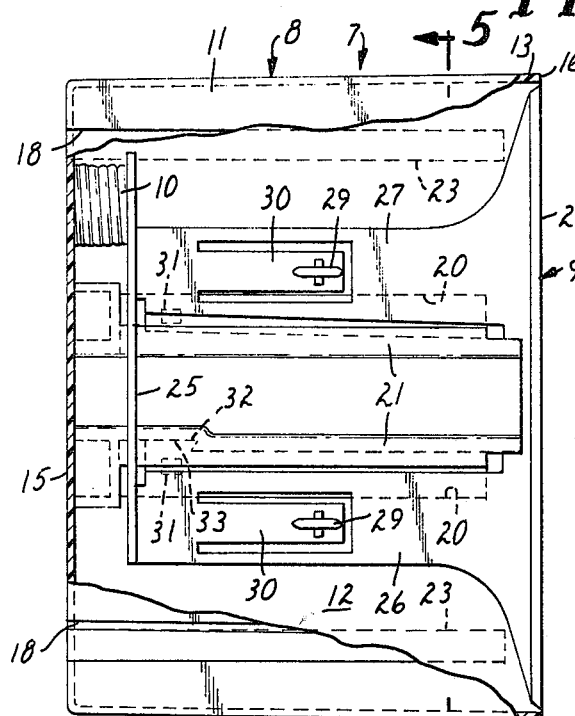
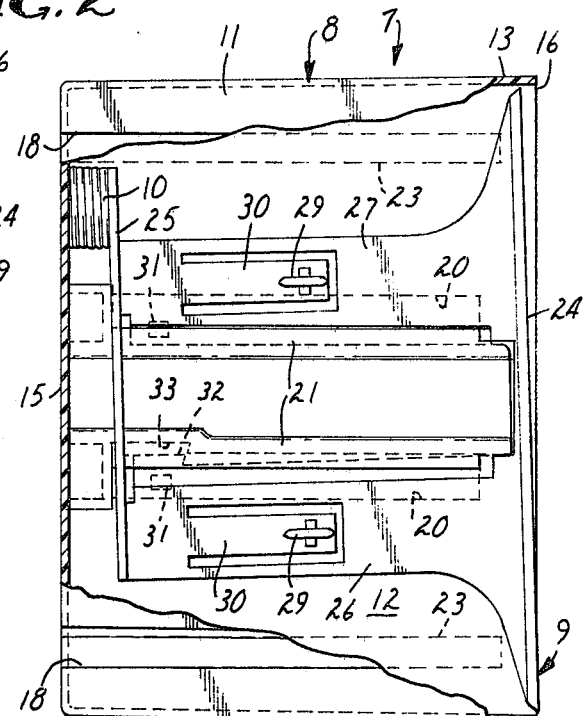
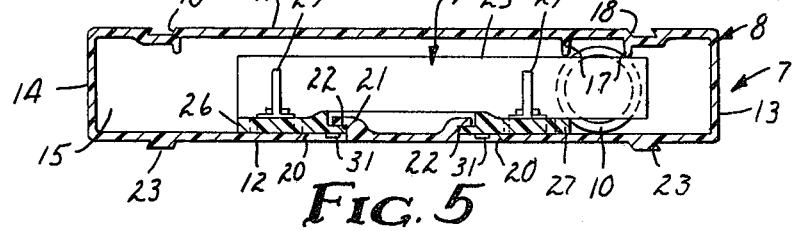

MAGNETIC TAPE CARTRIDGE CASE WITH BIASING MEANS

BACKGROUND OF THE INVENTION

1. Field of the Invention

The present invention relates in general to cases for storing magnetic tape cartridges and more specifically to such cases having means for spring biasing a cartridge or a drawer adapted for receiving a cartridge inserted therein.

2. Description of the Prior Art

A wide variety of containers with spring biased drawers are known in the art. Recently, containers with spring biased drawers have been developed to store magnetic tape cassettes as is evidenced by U.S. Pat. No. 3,899,229 to Ackeret, issued Aug. 12, 1975, and disclosing a case for storing a magnetic tape audio cassette.

The Ackeret case is formed of a housing having a drawer biased with a spring that opposes insertion of the drawer into the housing. The front portion of the drawer includes a movable latch member having a nib that serves as a catch. When the drawer is in a fully closed position, the nib fits into an aperture at the front of the housing to hold the drawer in place. To open the drawer, the latch member must be moved sufficiently to disengage the nib from the aperture, whereupon the drawer pops open in response to pressure from the bias spring.

Although the Ackeret case provides a relatively satisfactory and convenient structure for storage of magnetic tape cassettes, molding of the drawer with its movable latch member is undesirable in that a complex and expensive tool is required. Moreover, because the latch member must be easily movable, its connection to the drawer is relatively weak and subject to breaking.

The present invention is directed to a cassette storage case similar to the Ackeret case in many respects but employs a latching mechanism that differs from that of the Ackeret case in both structure and operation, and eliminates the movable latch member required by the Ackeret case.

SUMMARY OF THE INVENTION

The present invention provides an improved case for storing a magnetic tape cartridge. The case includes a housing having a socket adapted to receive a magnetic tape cartridge or to receive a drawer in which a cartridge can be placed, and biasing means that opposed movement of the drawer and/or cartridge into the socket and will cause it to pivot upon being fully inserted in the housing to thereby engage a latch means for releasably retaining the cartridge and/or drawer in the housing.

In the embodiment of the case which includes the drawer, the drawer is mounted on the housing by means for affording movement of the drawer between an open position projecting from the housing to receive a cartridge and a fully inserted position with the drawer within the socket, and for affording pivotal motion of the drawer relative to the housing at its fully inserted position. The latch means includes a member fixed to the drawer adapted for engagement with a member fixed to the housing. The latch members are spaced apart when the drawer is between its open and fully inserted positions and are movable into latching engagement to retain the drawer in the socket when the drawer is pivoted at its fully inserted position. The means for biasing the drawer toward its open position applies a force at a position off center of the drawer, thereby applying a rotational force to rotate the drawer and engage the members when the drawer is moved to its fully inserted position by an external force applied between the off center position and the farthermost edge of the drawer. To open the drawer the rotational force may be opposed by a force applied between the off center position and the adjacent edge of the drawer to rotate the door so that the latch members disengage and to allow movement of the drawer toward its open position under the influence of the means for biasing.

In the embodiment that does not include a drawer the housing includes a shoulder projecting from one of its walls into the socket adjacent the bottom of the socket. The shoulder is spaced from the opposite wall to afford movement of a cartridge therebetween and is positioned to engage an opening in the cartridge when the cartridge is fully received in the socket and rotated. The biasing means are adapted to engage the cartridge in an off center position adjacent the shoulder to bias the cartridge both for movement out of the socket and for rotational movement to engage the opening over the shoulder when the cartridge is fully received in the socket to thereby releasably retain the cartridge within the socket when the cartridge is pressed into the housing by an external force applied between the off center position and the farthermost edge of the cartridge. To release the cartridge, this rotational force is opposed by a force applied between the off center position and the adjacent edge of the cartridge to rotate the cartridge so that the opening and shoulder separate and to allow movement of the cartridge out of the housing under the influence of the biasing means.

BRIEF DESCRIPTION OF THE DRAWINGS

FIG. 2 is a plan view of the case of FIG. 1 with the top wall of the housing substantially cut away to expose the drawer in an open position;

FIG. 3 is a plan view of the case of FIG. 1 with the top wall of the housing substantially cut away to illustrate the drawer inserted and latched in the housing;

FIG. 4 is a plan view of the case of FIG. 1 with the top wall of the housing substantially cut away to illustrate the drawer inserted in the housing but pivoted out of a latched condition;

FIG. 5 is a cross sectional view taken along the line 5—5 of FIG. 3;

DESCRIPTION OF THE PREFERRED EMBODIMENTS

Figure 1:
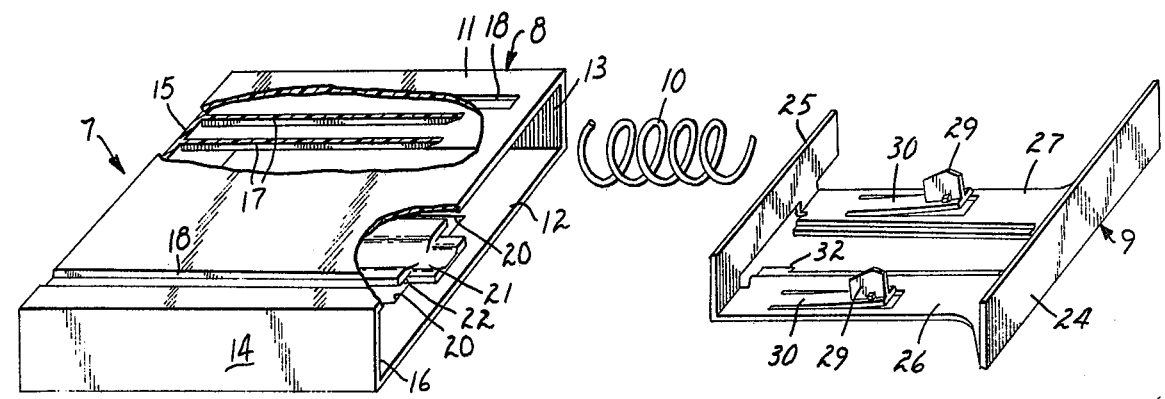
FIG. 1 is an exploded perspective view of a first preferred embodiment of the case of the present invention including a housing, a spring and a drawer.

Referring now to the drawings and with reference first to FIGS. 1, 2 and 5, a case 7 that represents a first preferred embodiment of the present invention is shown. The case 7 includes a housing 8, a drawer 9 that slidably fits into the housing 8 and a coil spring 10 that is disposed between the housing 8 and the back of the drawer 9.

The housing 8 has a rectangular configuration with top and bottom walls 11 and 12 respectively, sidewalls 13 and 14 and a rear wall 15 defining a socket accessible through and an open front 16 of the housing 8. The interior surface of the top wall 11 has a pair of spaced apart ridges 17 that are positioned off center of the transverse axis of the case 7. The ridges 17 run from the back edge of the top wall 11 to approximately three quarters of the way to the front edge of the wall 11 to serve as guides for maintaining the spring 10 in proper place in the housing 8 and also to minimize movement of a cassette inside the case 7. The exterior surface of the housing top wall 11 includes two side edge plow grooves 18 that begin at the rear wall 15 and extend nearly the entire width of the top wall 11.

Formed through the housing bottom wall 12 are a pair of slots 20 that are substantially parallel to the grooves 18 for a purpose to be described below. The interior surface of the housing bottom wall 12 includes a guide member 21 that extends from near the open front 16 to the rear wall 15 and is centered on the transverse axis of the housing 8. The side portions of the guide member 21 are raised so that there is a gap between the plane of the housing bottom wall 12 and each side portion of the guide member in the form of recesses 22.

Figure 6:
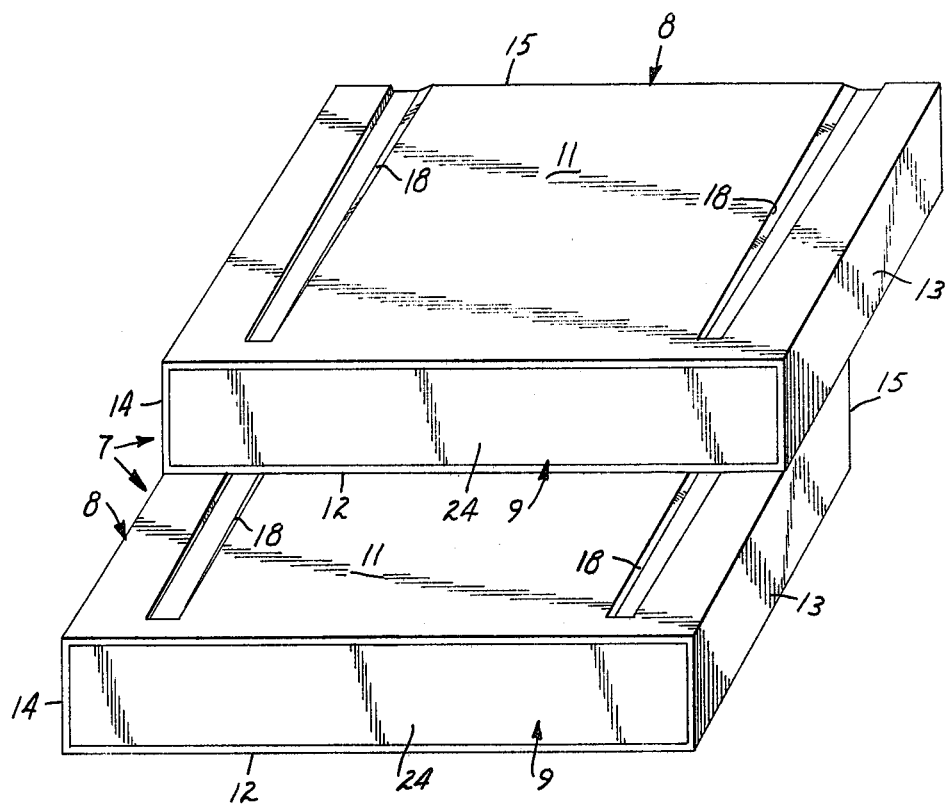
FIG. 6 is a perspective view of two cases of the present invention shown partially stacked together.

The exterior surface of the wall 12 includes a pair of slanted side edge ribs 23 that run from the back edge of the wall 12 to a point near the front edge of the wall 12. The ribs 23 substantially conform to the configuration of the grooves 18 in order that two or more cases 7 may be stacked together with the ribs of one case interfitted in the grooves of the other case, as indicated in FIG. 6. To facilitate such stacking, the ribs 23 and grooves 18 are not of a uniform width but are widest toward the rear wall 15. Accordingly, the front portions of the ribs 23 can be readily positioned into the back portion of the grooves 18.

The drawer 9 has a front wall 24 and a back wall 25 that are joined together by a bottom formed of two spaced apart arms 26 and 27. The drawer 9 is shaped to receive a standard size cassette cartridge, and preferably the upper surfaces of the arms 26, 27 include upstanding piers 29 that serve as hub locks for a cassette placed in the drawer 9. The piers 29 are formed on the end of partially raised resilient fingers 30 fixed at one end to the arms 26, 27. As a result, the piers 29 may be depressed downward to provide more clearance for inserting a cassette in the drawer. Once the cassette is in proper position in the drawer 9 the resilient fingers 30 return the piers 29 to their normal position in which they protrude into engagement with the hubs of the cassette and prevent movement thereof, as best indicated by FIG. 5. The use of the resilient fingers 30 is not essential to the present invention and instead the piers 29 may be mounted directly from the arms 26, 27. However, use of the resilient fingers 30 is highly preferable because they enable the piers 29 to more effectively prevent cassette hub movement.

The lower surfaces of the arms 26, 27 have nibs 31 that protrude therefrom to fit into the slots 20 in the bottom housing wall 12. The nibs 31 serve as limit of movement abutments that normally prevent the drawer 9 from being slid completely out of the housing 8. However, complete removal of the drawer 9 can be performed by sufficiently bending the drawer to force the nibs 31 out of the slots 20. The drawer 9 is sized to fit through the open front 16 of the housing 8 and the inside edges of the arms 26, 27 fit into the recesses 22 between the raised side portions of the member 21 and the bottom housing wall 12. The member 21 thereby serves to interlock the drawer 9 with the housing 8 and to guide the same as it is inserted into the housing 8.

As shown in FIG. 3, when the drawer 9 initially enters the housing 8, the spring 10 begins to compress and exerts an off center pressure on the drawer back wall 25. Such pressure urges the drawer 9 to pivot with respect to the transverse axis of the case 7. There is not sufficient clearance between the guide member 21 and the arms 26, 27 of the drawer 9 to permit such pivoting only because of a shoulder 32 that is formed near the rear end of the arm 26. The shoulder 32 bears against the guide member 21 and substantially prevents pivoting of the drawer 9 while it is being inserted into the housing 8. When the drawer 9 reaches a fully inserted position, the shoulder 32 becomes aligned with a notch 33 in an adjacent edge of the guide member 21. Pivoting of the drawer 9 then results as the shoulder 32 is accepted into the notch 33. Thereafter, the shoulder 32 and the walls of the guide member 21 defining the notch 33 serve as members of a latch means for semi-permanently holding the drawer 9 in the housing with the spring 10 maintained in a compressed condition.

Opening of the drawer 9 simply requires that one apply sufficient pressure on the side of the drawer front wall 24 nearest the spring 10 to overcome the pivoting force exerted on the drawer 9 by the spring 10. As a result, the shoulder 32 will be disengaged from the notch 33 as indicated in FIG. 4.

It should be noted that pivoting action of the drawer 9 will be affected by the manner in which the drawer is pushed into the housing 8. For example, if insertion pressure is exerted on the side of the drawer front wall 24 nearest the spring 10, such pressure will counteract the pivotal force exerted by the spring 10 on the drawer 9 to prevent the drawer 9 from pivoting. Preferably, therefore, insertion pressure on the drawer 9 should be applied on the side of the front wall 24 furthest away from the spring 10 so that drawer pivoting will be insured. Also, because the drawer 9 is pivoted with respect to the housing 8 when fully inserted therein, it is also preferable that the front wall 24 of the drawer 9 is slightly canted in order that the drawer front wall 24 will be in a perpendicular relationship to the housing sidewalls 13, 14, when in its fully inserted and latched position. Although the case 7 is shown with the notch 33 formed in the guide member 21 and the shoulder 32 formed as part of the drawer 9 the positioning of the notch 33 and shoulder 32 in this fashion is not critical as they may be interchanged.

Figure 7:
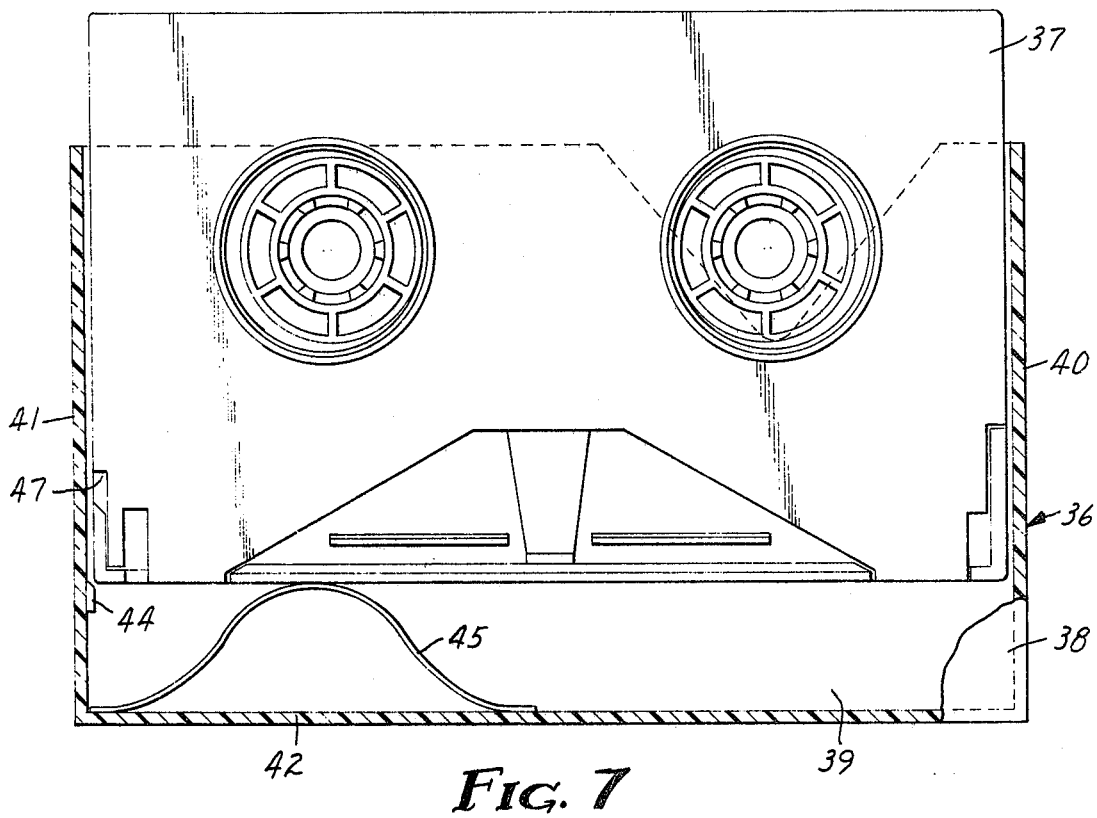
FIG. 7 is a plan view of a second preferred embodiment of the case of the present invention with the top wall of the housing substantially cut away and with a magnetic tape cartridge being inserted therein.
Figure 8:
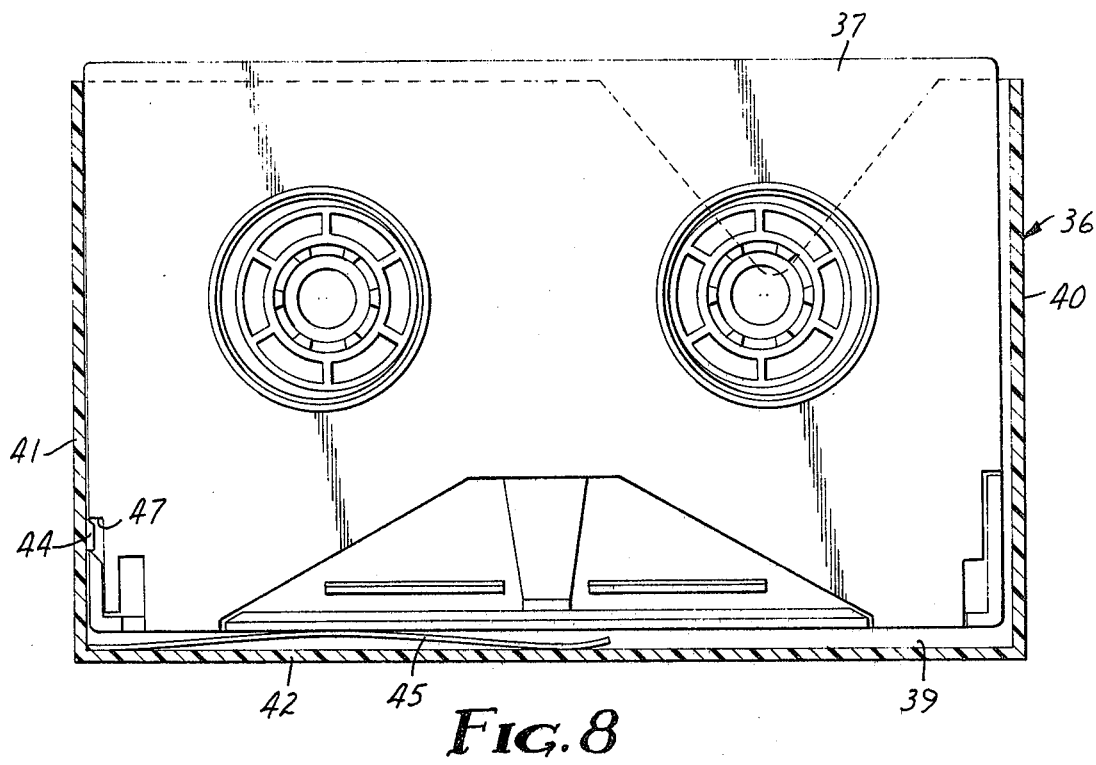
FIG. 8 is the case of FIG. 7 with the cartridge shown in a fully inserted position.

It is not essential to the case of the present invention that it contain a drawer in which a magnetic cartridge may be inserted. Instead, as shown in FIGS. 7 and 8, a case according to the present invention may also comprise a housing 36 adapted to receive a magnetic tape cartridge 37 without the use of a drawer. The housing 36 is of an open end construction having a top wall 38, bottom wall 39, sidewalls 40 and 41 and a back wall 42 defining a socket. Protruding into the socket from the inner surface of the sidewall 41 is a shoulder 44 and fixed to the back wall 42 in an off center position adjacent the sidewall 41 is a spring 45.

As shown in FIG. 7, the housing 36 is sufficiently large that the cartridge 37 can pass by the shoulder 44 as the cartridge is inserted into the housing 36. However, as full insertion of the cartridge 37 nears completion via a force applied to the side of the cartridge between its farthest edge and the spring 45, the spring 45 causes pivoting of the cartridge 37 against the shoulder 44. As the cartridge 37 reaches its fully inserted position, the cartridge 37 pivots to a latched position with the shoulder 44 within a notch 47 in a sidwall of the cartridge 37 whereupon the portions of the cartridge 37 defining the notch 47 and the shoulder 44 serve as members of a latch means for releasably holding the cartridge 37 in the case 36 in opposition to the spring 45. When a force is applied to the cartridge 37 between its adjacent side and the spring 45 the cartridge is caused to rotate out of its latched position where the spring 45 can move it out of the housing 36.

What is claimed is:

1. A case adapted for receiving a magnetic tape cartridge having an opening in one sidewall, said case comprising:
   a housing having walls defining a socket adapted to receive the cartridge, and a shoulder projecting from one of said walls into said socket adjacent the bottom of the socket, said shoulder being spaced from the opposite wall to afford movement of a cartridge therebetween and being positioned to engage the opening of a said cartridge fully received in said socket; and
   biasing means in said socket adapted for engaging a cartridge inserted in the socket in an off center position adjacent said shoulder to bias the cartridge both for movement out of said socket and for rotational movement to engage the opening in a cartridge fully received in said socket over the shoulder and thereby releasably retain the cartridge within the socket when the cartridge is pressed into said housing by an external force applied between said position and the farthermost edge of the cartridge, said rotational force being opposable by a force applied between said position and the adjacent edge of the cartridge to separate the opening and shoulder and allow removal of the cartridge under the influence of the biasing means.

2. A case adapted for storing a magnetic tape cartridge, said case including:
   a housing having walls defining a socket;
   a drawer adapted to receive a said cartridge, said drawer and a said cartridge positioned therein being adapted to be received in said socket;
   means mounting said drawer on said case for movement between an open position projecting from said housing to receive a said cartridge and a fully inserted position with said drawer within said socket, and for affording pivotal motion of said drawer relative to said housing at said fully inserted position;
   latch means including a member fixed to said drawer adapted for engagement with a member fixed to said housing, said members being spaced apart when said drawer is between said open and fully inserted positions and being movable into latching engagement to retain said drawer in said socket when said drawer is pivoted at said fully inserted position; and
   means for biasing said drawer toward said open position at a position off center of said drawer to apply a rotational force to rotate said drawer and engage said members when said drawer is moved to said fully inserted position by an external force applied between the off center position and the farthermost edge of said drawer, said rotational force being opposable by a force applied between the off center position and the adjacent edge of the drawer to disengage said members and allow movement of said drawer toward its open position under the influence of said means for biasing.

3. A case according to claim 2, wherein said drawer has a bottom, a pair of resilient fingers each attached at one end to said bottom and having an unsupported end, and two upstanding piers each attached to the unsupported end of a different one of said fingers, said piers being adapted to serve as hub locks for the hubs of a said cartridge received in said drawer.

* * * * *